(12) United States Patent
Haller et al.

(10) Patent No.: US 8,122,943 B2
(45) Date of Patent: Feb. 28, 2012

(54) HEAT EXCHANGER WITH HEAT STORAGE

(75) Inventors: Régine Haller, Boissy sans Avoir (FR); Sylvain Moreau, Spay (FR); Jean-Luc Thuez, Fourqueux (FR)

(73) Assignee: Valeo Climatisation, La Verriere (FR)

( * ) Notice: Subject to any disclaimer, the term of this patent is extended or adjusted under 35 U.S.C. 154(b) by 1071 days.

(21) Appl. No.: 11/791,427

(22) PCT Filed: Nov. 30, 2005

(86) PCT No.: PCT/FR2005/002990
§ 371 (c)(1),
(2), (4) Date: Nov. 14, 2007

(87) PCT Pub. No.: WO2006/059005
PCT Pub. Date: Jun. 8, 2006

(65) Prior Publication Data
US 2010/0018231 A1    Jan. 28, 2010

(30) Foreign Application Priority Data

Nov. 30, 2004 (FR) ...................................... 04 12680
Nov. 30, 2004 (FR) ...................................... 04 12682

(51) Int. Cl.
*F28D 17/00* (2006.01)
*F28D 1/03* (2006.01)

(52) U.S. Cl. ............................ 165/10; 165/153; 165/902

(58) Field of Classification Search ................... 165/902, 165/153, 78, 79, 148, 173, 175, 10; 62/515, 62/238.6, 244
See application file for complete search history.

(56) References Cited

U.S. PATENT DOCUMENTS 3,262,190 A * 7/1966 Rostoker et al. ......... 29/890.035
(Continued)

FOREIGN PATENT DOCUMENTS

EP    1 221 389 A    7/2002
(Continued)

*Primary Examiner* — Leonard R Leo
(74) *Attorney, Agent, or Firm* — Howard & Howard Attorneys PLLC

(57) ABSTRACT

Heat exchanger, for example for a motor vehicle air-conditioning circuit, comprising a plurality of tubes (12) for circulating a heat-transfer fluid, the ends of said tubes (12) opening into manifolds and reservoirs (11) of thermal storage material in contact with the tubes (12) so that the storage material and the heat-transfer fluid exchange heat with one another. The exchanger comprises a plurality of heat-exchange elements (4) each housing at least one reservoir (11) and at least one tube (12) which are nested.

13 Claims, 6 Drawing Sheets

U.S. PATENT DOCUMENTS

| | | | |
|---|---|---|---|
| 3,306,353 A * | 2/1967 | Burne | 165/164 |
| 4,679,410 A | 7/1987 | Drayer et al. | |
| 4,846,268 A * | 7/1989 | Beldam et al. | 165/153 |
| 4,969,512 A * | 11/1990 | Hisao et al. | 165/153 |
| 5,082,048 A * | 1/1992 | Iwaki et al. | 165/104.12 |
| 5,141,720 A * | 8/1992 | Malmstrom et al. | 422/200 |
| 5,413,169 A * | 5/1995 | Frazier et al. | 165/153 |
| 5,585,145 A * | 12/1996 | Maier-Laxhuber et al. | 427/380 |
| 6,142,222 A * | 11/2000 | Kang et al. | 165/148 |
| 6,284,206 B1 * | 9/2001 | Lesieur et al. | 422/198 |
| 6,467,536 B1 * | 10/2002 | Abate et al. | 165/153 |
| 6,604,573 B2 * | 8/2003 | Morishima et al. | 165/153 |
| 6,938,685 B2 * | 9/2005 | Duerr et al. | 165/148 |
| 7,337,833 B2 * | 3/2008 | Laveran et al. | 165/153 |
| 2002/0002837 A1 | 1/2002 | Shirota et al. | |

FOREIGN PATENT DOCUMENTS

| | | |
|---|---|---|
| FR | 2 847 973 A | 6/2004 |
| JP | 2000205777 A | 11/2000 |

\* cited by examiner

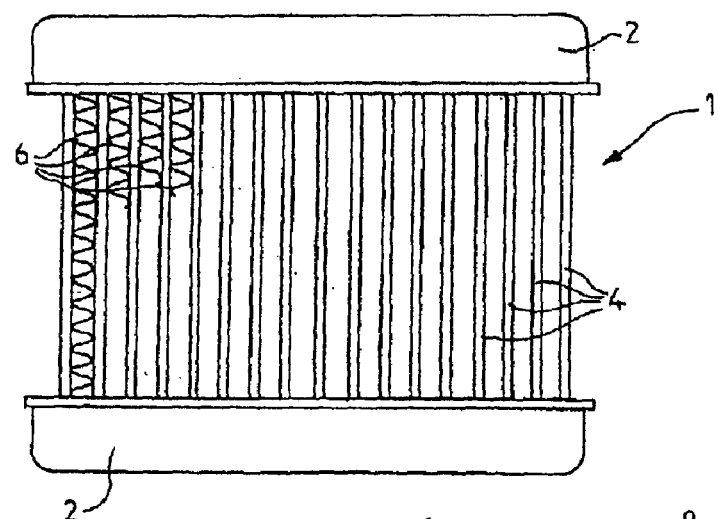
FIG.1
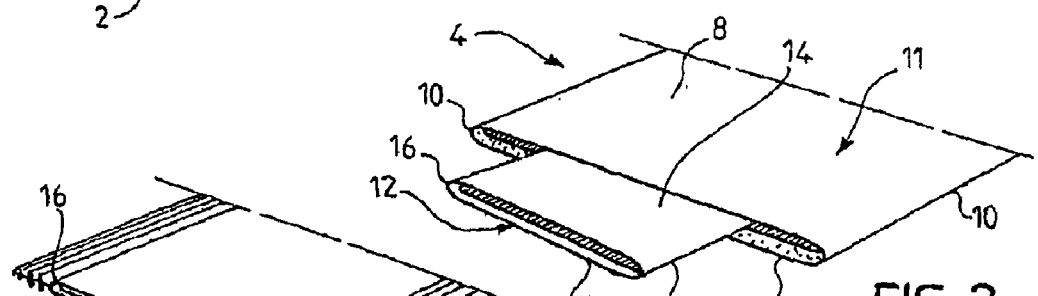
FIG.2
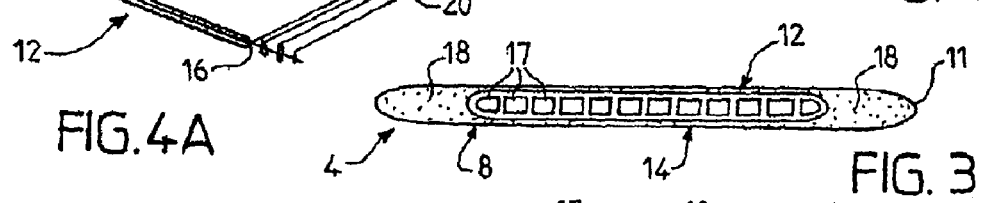
FIG. 3
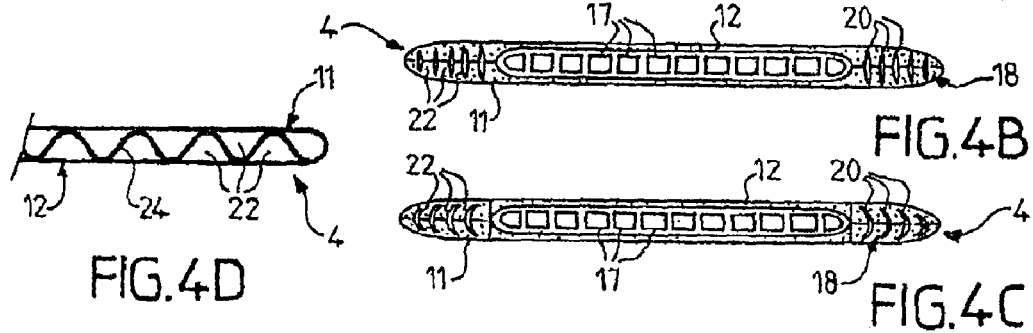
FIG.4A
FIG.4B
FIG.4D
FIG.4C

HEAT EXCHANGER WITH HEAT STORAGE

RELATED APPLICATIONS

This application claims priority to and all the advantages of International Patent Application No. PCT/FR2005/002990, filed on Nov. 30, 2005, which claims priority to French Patent Application No. FR 0412682, filed on Nov. 30, 2004 and French Patent

BACKGROUND OF THE INVENTION

The invention relates to a heat exchanger, for example one used in the automotive field and more specifically to a heat exchanger comprising a plurality of tubes for the circulation of a heat-transfer fluid, the ends of said tubes opening into manifolds, and reservoirs of thermal storage material in contact with the tubes so that the storage material and the heat-transfer fluid exchange heat with one another.

The purpose of a heat exchanger is to provide an exchange of heat between a fluid circulating within a plurality of tubes, known as a heat-transfer fluid, and an external, fluid passing through the heat exchanger. In the case of a motor vehicle air-conditioning system, the external fluid may be air intended to be blown into the cabin of the vehicle. The exchange of heat is used to cool the blown air.

The tubes conventionally open into manifolds, one function of which is to place all or some of this plurality of tubes in fluidic communication.

The heat exchanger is connected to the remainder of the fluid circulation circuit, for example a motor vehicle air-conditioning circuit. The fluid is circulated through the circuit by a compressor driven directly off the engine of the motor vehicle.

In consequence, when the vehicle engine is not running, there is no circulation of fluid through the circuit and exchange of heat between the air and the heat-transfer fluid cannot take place. The air blown into the cabin of the vehicle is therefore no longer cooled. This situation is becoming all the more problematical since recent fuel-economizing systems anticipate automatically switching the engine off when the vehicle comes to a standstill, often depriving the cabin of cooled air.

It is known practice to provide a heat exchanger with reservoirs of thermal storage material associated with the tubes through which the heat-transfer fluid circulates.

For example, French patent application FR 2 847 973 provides a heat exchanger equipped with special tubes that have a plurality of passages for circulating heat-transfer fluid and a plurality of longitudinal cavities adjoining said passages. These longitudinal cavities accommodate a thermal storage material, while the passages allow the refrigerant to circulate. Through contact between the cavities and the passages, the storage material and the heat-transfer fluid can exchange heat with one another.

Thus, when the vehicle engine is running, the refrigerant cools both the air passing through the heat exchanger and the thermal storage material. The thermal storage material then releases the coldness (more specifically the cold energy) to the air passing through the heat exchanger when the engine is switched off.

Although these special tubes have proved satisfactory, they are relatively complicated and expensive to produce.

BRIEF SUMMARY OF THE INVENTION

One of the objects of the invention is to overcome the aforementioned disadvantages by proposing a heat exchanger of a novel type which comprises a plurality of heat-exchange elements each one housing at least one reservoir and at least one tube which are nested together.

Thus, the thermal storage material at least partially surrounds the heat-transfer fluid tubes, improving the exchange of heat between this material and this fluid.

In one embodiment, the manifolds consist of a collection of tube end-pieces, each end-piece having connecting means for connecting it to another end-piece and to allow the heat-transfer fluid to pass from one tube end-piece to the other. This makes it possible to obtain manifolds that occupy a small amount of space.

In this case, each tube end-piece preferably has a connecting face designed to press against a connecting face of an adjacent tube end-piece, each connecting face being provided with a fluid-passage opening that coincides with the fluid-passage opening of the connecting face of the adjacent tube end-piece. This configuration requires even less space.

It is then advantageous for each fluid-circulation tube end-Piece to consist of two symmetric lugs each having a connecting face and a bearing face, the bearing faces coming into contact with one another. In this case, a tube may be wedged between the symmetric lugs of the tube end-piece.

In one embodiment of the invention, said heat-exchange element consists of a reservoir of tubular overall appearance, inside which a tube is housed. Manufacture of such a heat exchanger is considerably simplified and inexpensive. Indeed, all that is required is for the tubes to be produced and a tubular reservoir, that is easy to manufacture, added to them. In particular, the reservoir and the tubes may be made separately.

Advantageously, the tube is then positioned in a central region of the reservoir, forming two volumes for storing thermal storage material, one on each side of said tube, so as to allow a good exchange of heat between the heat-transfer fluid and the thermal storage material.

As an option, the heat exchanger may comprise at least one insert of corrugated shape able to be housed in one of the storage volumes of a reservoir between the tube and said reservoir. The insert thus allows the storage volume in which it is housed to be partitioned.

In an advantageous embodiment, each tube for circulating heat-transfer fluid has two mutually parallel lateral faces, each reservoir has two mutually parallel lateral faces, and each of the lateral faces of a tube is in, surface-to-surface contact with one of the lateral faces of a reservoir. Thus, tubes known by the name of "flat tubes" are used to make the heat exchanger according to the invention. Hence, the reservoir may adopt the form of a larger flat tube. The surface-to-surface contact allows a good transfer of heat between the tube and the reservoir, something which is important for correct operation of the heat exchanger when the engine is running, as will be seen later.

One advantageous configuration has the ends of the tubes protruding from the reservoirs, and each reservoir equipped with closing-off means designed to allow a tube through.

The closing-off means may then consist of a reservoir end-piece in which a passage for a fluid-circulation tube is formed.

In this case, it is advantageous for each reservoir end-piece to consist of two symmetric lugs, each lug having a bearing face coming into contact with the bearing face of the other lug, and each bearing face to have an indentation of a shape designed to at least partially house a fluid-circulation tube. Thus, the reservoir end-piece may be folded onto the reservoir, trapping its end.

As a preference, each bearing face of a reservoir end-piece has an opening into which said indentation opens.

In an advantageous embodiment, each lug of a tube end-piece forms a one-piece entity with one of the lugs of a reservoir end-piece, which, means that the tube and reservoir end-pieces can be produced as a one-off entity.

In another embodiment of the invention, said heat-exchange element consists of a reservoir comprising two generally symmetric end-plates each having a bearing face that comes into contact with the bearing face of the other end-plate, and each bearing face having an indentation able to at least partially house a tube for circulating heat-transfer fluid. In this embodiment, the reservoir is made in two parts which are assembled, trapping a tube.

In this embodiment, the reservoir may be equipped with closing-off means consisting of two symmetric shells each having a bearing face designed to come into contact with the bearing face of the other shell.

As a preference, each bearing face of a shell has an indentation of a shape designed to at least partially house the end-piece of a tube for circulating heat-transfer fluid.

In this case, each shell is advantageously provided with at least one opening that coincides with one opening in a tube end-piece.

As a preference, each end-plate forms a one-piece entity with a shell.

In one particular embodiment, each fluid-circulation tube consists of two pressed plates combined.

As an option, the combined pressed plates externally exhibit recessed regions for holding the thermal storage material.

The shells may have a hole in communication with a reservoir.

In another embodiment of the invention, said heat-exchange element consists of two closing-off plates and of at least one first interposed intermediate plate in which at least one tube profile and one reservoir profile are cut. Thus, the heat-exchange element may easily be made up of plates, for example made of metal sheet, which have been cut.

Advantageously, the tube profile then has the overall appearance of a U. In this case, just one manifold is needed, thus simplifying the structure of the heat exchanger.

One advantageous configuration has the branches of the U extending in the form of corrugations and the corrugations of the branches complementing one another. It is thus possible to produce a tube which is very long but still falls within the footprint defined by the dimensions of the intermediate plate.

In one particular embodiment, the profile of each reservoir complements at least part of the profile of a tube, so as to reduce the amount of material separating the tubes from the reservoirs and therefore improve the exchange of heat between the thermal storage material and the heat-transfer fluid.

A reservoir profile may then be cut from between each pair of branches of the U and from outside each branch of the U, so as to optimize the volume offered by the intermediate plate.

In a preferred embodiment, said heat-exchange element further consists of a second interposed intermediate plate in which at least one tube profile and one reservoir profile are cut. A heat-exchange element then comprises several reservoirs and several fluid-circulation tubes.

In this case, an intermediate closing-off plate may be inserted between the first and second intermediate plates.

The intermediate closing-off plate then preferably comprises at least one series of holes placing at least one tube profile and/or at least one reservoir profile of each of the first and second intermediate plates in communication. This ensures communication between the reservoirs and/or the tubes.

In an advantageous configuration, the closing-off plates have at least one hole in communication with a tube profile, and these plates also have an additional hole in communication with a reservoir. This means that a heat-exchange element can be supplied with storage material and with heat-transfer fluid.

In a preferred embodiment, the heat-transfer fluid is a fluid of the refrigerant type and in that the thermal storage material is a material capable of storing cold energy. Thus, the heat exchanger can be used in a motor vehicle air-conditioning circuit.

BRIEF DESCRIPTION OF THE SEVERAL VIEWS OF THE DRAWINGS

Other characteristics and advantages of the invention will become apparent from examining the detailed description hereinafter and the attached drawings in which:

FIG. 1 is a schematic front view of a heat exchanger according to the invention in a first embodiment provided with heat-exchange elements, FIG. 2 is a perspective part view of a heat-exchange element of the heat exchanger of FIG. 1 according to a first configuration, FIG. 3 is a view in cross section of the heat-exchange element of FIG. 2, FIG. 4A is a perspective part view of part of a heat-exchange element of the heat exchanger of FIG. 1 in a second configuration, FIG. 4B is a view in cross section of a heat-exchange element of the heat exchanger of FIG. 1 in an embodiment variant, FIG. 4C is a view in cross section of a heat-exchange element of the heat exchanger of FIG. 1 in another embodiment variant, FIG. 4D is a view in partial cross section of the heat-exchange element of FIG. 2 in an embodiment variant.

Figure 5:
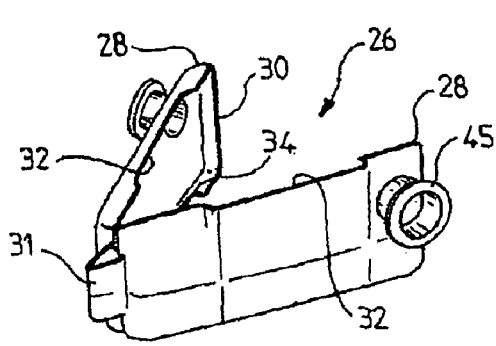
FIG. 5 is a perspective view of a reservoir end-piece according to the invention in a first configuration.

The attached drawings may not only serve to complete the invention, but also contribute to its definition as necessary.

DETAILED DESCRIPTION OF THE EXEMPLARY EMBODIMENTS

FIG. 1 is a schematic front view of a heat exchanger according to the invention in the first embodiment.

The heat exchanger 1 consists of two header boxes 2 of parallelepipedal overall shape positioned facing one another. Between the header boxes 2 there is a bundle of heat-exchange elements 4 intended to contain a thermal storage material and a heat-transfer fluid, these elements being aligned. The heat-exchange elements 4 are of tubular overall appearance as illustrated in FIG. 2. Positioned between each pair of adjacent heat-exchange elements 4 is a heat-exchange insert 6. The purpose of the heat-exchange insert 6 is to increase the surface area for exchange of heat between a thermal storage material, a heat-transfer fluid both contained in the heat-exchange elements 4, and the air passing through the heat exchanger 1.

FIG. 2 is a perspective part view of a heat-exchange element 4 of the heat exchanger 1 of FIG. 1. The heat-exchange element 4 consists of a reservoir 11. The reservoir 11 is of oblong cross section and has two more or less rectangular parallel large lateral faces 8 connected by curved joining portions 10. The reservoir 11 may be considered to be a large-sized flat tube. The term "flat tube" is to be understood as meaning a tube in which the separation between the two large faces is small compared with the width of these large faces. The reservoir 11 may similarly be produced as plate tube, bent tube, extruded tube, rolled tube or in any other known form.

The heat-exchange element 4 further consists of a fluid-circulation tube 12 positioned in the interior space of the reservoir 11, in a central region. In this embodiment, the tube 12 is of the flat tube type. The fluid-circulation tube 12 has, like the tubular reservoir 4, two symmetric and more or less rectangular flat large lateral faces 14 connected in pairs by curved joining portions 16. The reservoir 11 and the tube 12 which are described here are of similar forms and of the flat type, but other configurations are conceivable. It is thus possible to have a fluid-circulation tube of circular cross section positioned inside a reservoir of round cross section. It is also possible to have a fluid-circulation tube of round cross section positioned inside a reservoir of the flat type.

Furthermore, various types of flat tube may be positioned inside the reservoir 11, particularly plate tubes, bent tubes, extruded tubes, rolled tubes or tubes of any other known form.

FIG. 3 is a cross section through the heat-exchange element 4. The tube 12 has a plurality of longitudinal passages 17 for the circulation of a heat-transfer fluid which in this instance is a refrigerant. Such a tube 12 is sometimes termed a "multi-passage flat tube". Other types of tube may be used here, particularly tubes with a single passage.

The flat tube 12 is positioned in a central region of the reservoir 11. Since the flat tube 12 is smaller than the reservoir 11, two longitudinal storage volumes 18 for storing material are formed, one on each side of the flat tube 12 inside the reservoir 11. These storage volumes 18 may be filled with a thermal storage material, for example a material that stores cold energy. When it is a refrigerant that circulates inside the longitudinal passages 17, this refrigerant in particular cools the cold storage material contained in the storage volumes 18.

The lateral faces 14 of the flat tube 12 are in contact over their entire surface with the lateral faces 8 of the reservoir 11. Thus, the exchange of heat between the heat-transfer fluid circulating inside the longitudinal passages 17 of the flat tube 12 and the air brushing across the lateral faces 8 of the reservoir 11 are optimized. In order further to enhance the exchange of heat, the heat-exchange inserts 6 (not depicted in FIG. 3) are in contact with the lateral faces 8 of the reservoir 11.

FIG. 4A illustrates an embodiment variant of the flat tube 12. In this variant, the flat tube 12 has, associated with the curved joining portions 16, a series of partitioning elements 20 of rectangular overall shape positioned in such a way that their length follows the length of the flat tube 12 and their height lies at right angles to the major axis of the oblong cross section of the flat tube 12. This height is more or less equal to the thickness of the reservoir 11.

FIG. 4B is a view in cross section of the flat tube 12 of FIG. 4A positioned inside the reservoir 11 of FIG. 2. Once this flat tube 12 has been equipped with the partitioning elements 20 introduced into the reservoir 11, the storage volumes 18 are partitioned and exhibit a plurality of longitudinal compartments 22 containing thermal storage material.

FIG. 4C is a view in section of an embodiment variant of the partitioning elements 20 of FIG. 4A. In this variant, the partitioning elements 20 are of curved overall appearance like the curved joining portions 10 of the tubular reservoir 11.

As FIG. 4D shows, the storage volumes 18 may, as an option, be partitioned each by means of an insert 24 of corrugated overall appearance.

It is noted that, in the heat-exchange element 4, the reservoir 11 and the tube 12 are nested or imbricated with one another so that, in a mid-plane of the heat-exchange element 4 parallel to the large faces 8 of the reservoir 11 there is a section of tube 12 for the circulation of heat-transfer fluid flanked by two portions of reservoir for thermal storage material 11. This arrangement makes it possible to obtain a good exchange of heat between the storage material and the heat-transfer fluid.

FIG. 5 is a perspective view of a reservoir end-piece 26 comprising two symmetric lugs 28 each having a bearing face 30. The symmetric lags 28 are connected to one another by a metal strap 31 which can be bent in such a way that the bearing faces 30 come into contact with one another. Each bearing face 30 has a first indentation 32 the shape of which is designed to house more or less half the cross section of the flat tube 12. Each bearing face 30 also has a second indentation 34 of a shape designed to house approximately half the cross section of the reservoir 11. The first 32 and second 34 indentations communicate with one another. By folding the symmetric lugs 28 one against the other, the second indentations 34 of the bearing faces 30 define a first housing the shape of which is designed to accommodate one of the ends of the reservoir 11 and allow a flat tube 12 to pass through.

Thus, the reservoir end-piece 26 plugs the end of the reservoir 11 while at the same time allowing the flat tube 12 to pass, which flat tube protrudes from the reservoir end-piece 26. The flat tubes 12 protrude from the reservoirs 11, and more specifically from the reservoir end-pieces 26 so can be accommodated in the header boxes 2.

Figure 6:
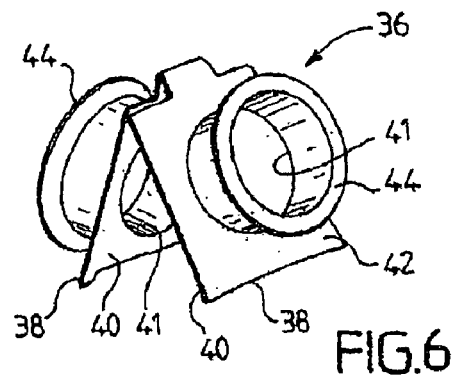
FIG. 6 is a perspective view of a tube end-piece according to the invention in a first configuration.

In another embodiment of a heat exchanger according to the invention, a tube end-piece 36, which is illustrated in perspective view in FIG. 6, may be used. The tube end-piece 36 consists of two symmetric lugs 38 each having a bearing face 40 and a connecting face 42. The bearing faces 40 are designed to come to bear against one another and thus enclose the tube end-piece 36. Each of the bearing faces 40 has an indentation, not depicted, capable of housing part of the cross section of a flat tube 12. Thus, once closed, the tube end-piece 36 is able to accept the end of a flat tube 12. Each of the bearing faces 40 and connecting faces 42 of one and the same symmetric lug 38 has the same circular fluid-passage opening 41 passing through it to allow the refrigerant to pass from the flat tube 12 out of the tube end-piece 36. Each of the connecting faces 42 is also equipped with an annular collar 44 projecting from the connecting face 42 and surrounding the fluid-passage opening 41. The annular collar 44 is designed to press against an annular collar 44 of an adjacent tube end-piece 36. In this embodiment, a manifold is produced by successively stacking tube end-pieces 36, each annular collar 44 coming to bear against an annular collar 44 of an adjacent tube end-piece 36.

Figure 7:
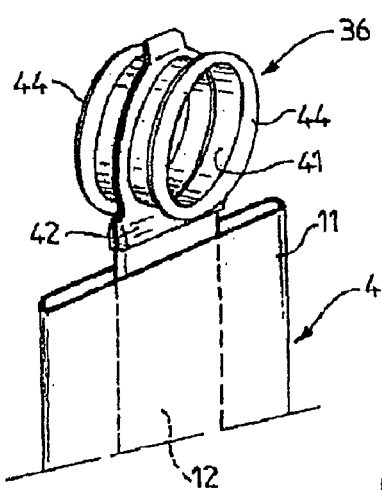
FIG. 7 is a perspective view of the tube end-piece of FIG. 6 and of a tub.

FIG. 7 illustrates, viewed in perspective, a flat fluid-circulation tube 12 equipped with the end-piece 36 illustrated in FIG. 6 and positioned inside a reservoir 11 to form a heat-exchange element 4.

In one particular embodiment (which is not depicted), a heat exchanger is produced by joint use of the reservoir end-piece 26 of FIG. 5 to plug the reservoirs 11 and the tube end-piece 36 of FIG. 6 to form the fluid manifolds.

Figure 8:
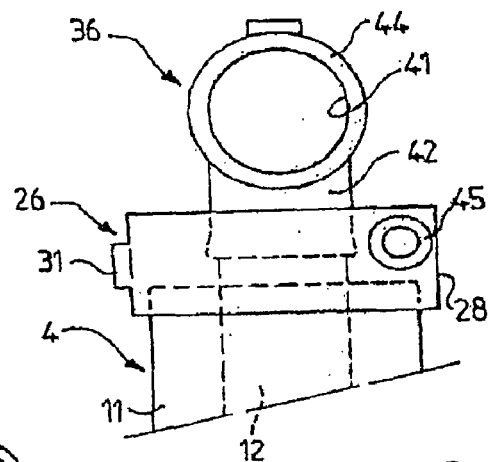
FIG. 8 is a front view of a reservoir end-piece in a second configuration and of a tube end-piece of FIG. 7.

In an embodiment variant which is illustrated in FIG. 8, the shape of the first indentations 32 of the reservoir end-piece 26 is designed not to house the flat tube 12 but this time to partially house one of the symmetric lugs of a tube end-piece 36. Thus, the bottom part of the tube end-piece 36 is trapped in the reservoir end-piece 26, as shown by FIG. 8.

As an option, an opening for the passage of thermal storage material 45 may be made in one of the symmetric lugs 28 of the reservoir end-piece 26, this opening communicating with one of the second indentations 34. This opening may be used for filling the storage volumes 18.

Figure 9:
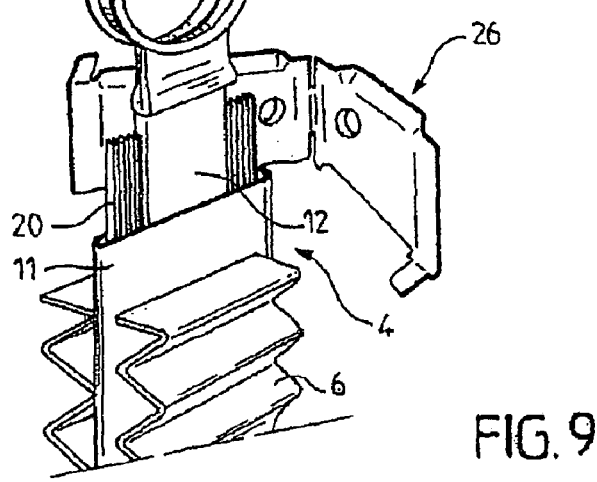
FIG. 9 is an exploded perspective part view of the heat-exchange element of FIG. 8 in an embodiment variant.

FIG. 9 illustrates an embodiment variant comprising a reservoir end-piece 26 of the type illustrated in FIG. 8, a tube end-piece 36 of the type described previously and a tube 12 of the type illustrated in FIG. 4A.

Figure 10:
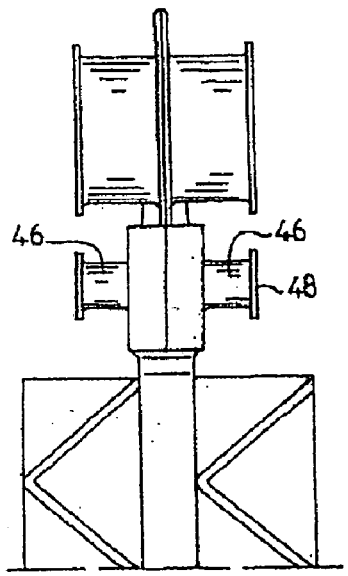
FIG. 10 is a side view of the heat-exchange element of FIG. 9.

FIG. 10 is a side view of the embodiment variant of the invention illustrated in FIG. 9. As an option, a connecting member 46 of tubular shape, equipped at its end with a flange 48 projecting from a symmetric lug 28 of the reservoir end-piece 26 and surrounding an opening for the passage of thermal storage material may be provided. A flange 48 on a connecting member 46 is designed to press against the flange 48 of a connecting member 46 of an adjacent reservoir end-piece 26. Successive stacking of connecting members 46 forms a duct for the passage of the thermal storage fluid fed to each of the reservoirs 11 of a heat exchanger. Thus, it becomes easier to fill the reservoirs 11, that is to say to fill the storage volumes 18.

Figure 11A:
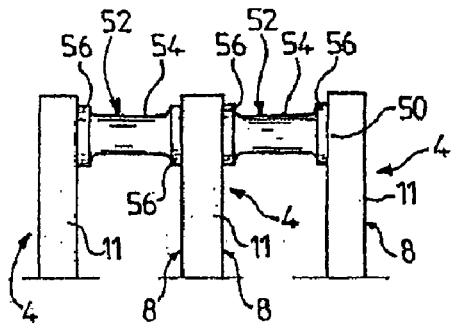
FIG. 11A is a schematic part view from the side of several heat-exchange elements of FIG. 10.
Figure 11B:
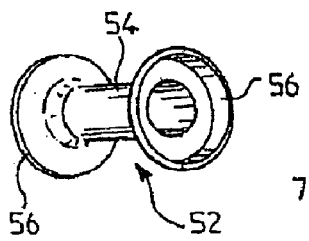
FIG. 11B is a perspective view of part of FIG. 11A alone.

FIGS. 11A and 11B illustrate an embodiment variant in which an opening 50 for the passage of thermal storage material is made in each of the lateral faces 8 of the reservoirs 11. In one reservoir 11, one of the openings communicates with, one of the storage volumes 18, the other opening being in communication with the other storage volume 18. A connecting member 52 is then provided. As shown in detail in FIG. 11B, the connecting member 52 is provided in the form of a short length of tube 54 of circular cross section, each of the ends of which terminates in the form of a flared collar 56. One of the flared collars 56 of a connecting member 52 bears against a lateral face 8 of a reservoir 11, surrounding an opening 50 for the passage of thermal storage material, the other flared collar 56 bearing against another tubular reservoir 11 in a similar way. The connecting members 52 make it possible to create a duct for feeding the reservoirs 11, as described above.

Figure 12:
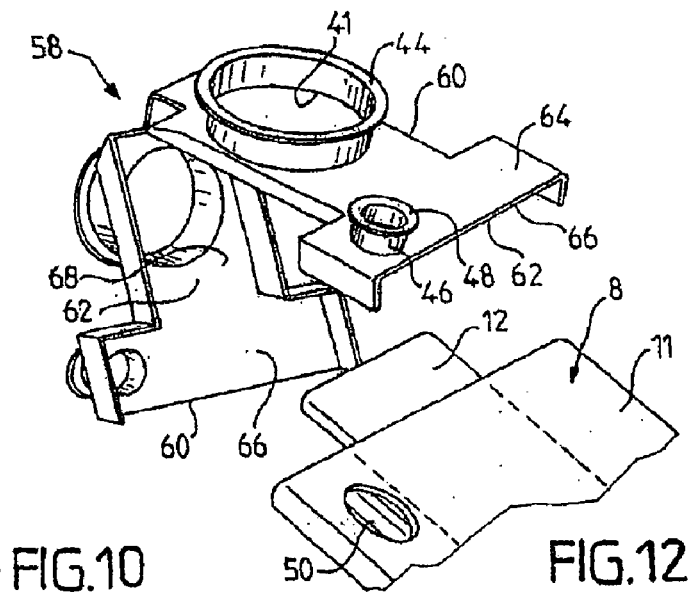
FIG. 12 is an exploded perspective part view of a tube end-piece and of a reservoir end-piece combined.

FIG. 12 illustrates, viewed in perspective, a combined end-piece 58 performing both the functions of a tube end-piece 36 and those of a reservoir end-piece 26. The combined end-piece 58 is in the form of two symmetric lugs 60 each having a bearing face 62 and a connecting face 64. Each symmetric lug 60 has a reservoir end-piece part where the bearing face 62 has a first indentation 66 able to house approximately half the cross section of the reservoir 11 near its end. Each of the first indentations 66 is extended in the form of a second indentation 68 able to house approximately half the cross section of the flat tube 12. Each of the second indentations 68 opens radially into an opening 41 for the passage of heat-transfer fluid, this opening being surrounded by an annular collar 44 of the type described above. In this embodiment, it will be noted that the reservoir 11 is equipped with a circular opening 50 for the passage of thermal storage material of the type described above and with a connecting member 46 also described hereinabove.

Figure 13:
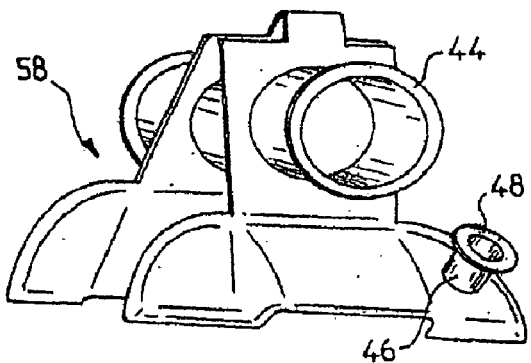
FIG. 13 is an exploded perspective view of a tube end-piece and of a reservoir end-piece combined in another embodiment variant.

FIG. 13 is a view of the combined end-piece 58 of FIG. 12 from a different angle.

Figure 14:
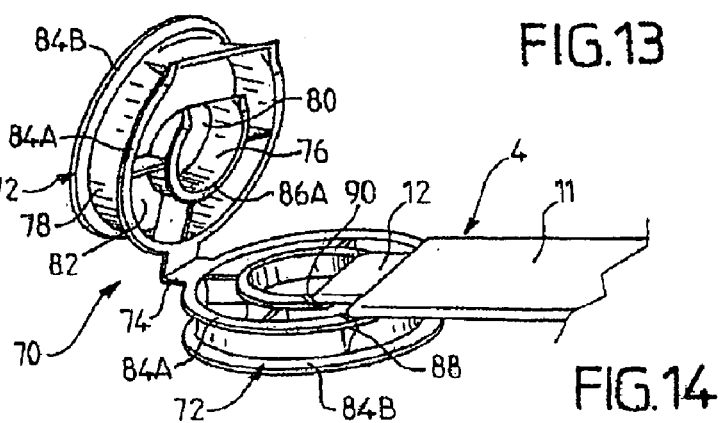
FIG. 14 is a partial perspective view of a tube end-piece and of a reservoir end-piece combined in yet another embodiment variant.

FIG. 14 is a perspective view of a combined end-piece 70 as a variant embodiment of the combined end-piece 58 of FIG. 12. The combined end-piece 70 is in the form of two symmetric branches 72 joined together by a connecting loop 74 which can be folded to bring the branches 72 to bear against one another. Each of the symmetric branches 72 is of cylindrical overall appearance with an annulus-shaped cross section comprising an internal wall 76 of cylindrical shape and an external wall 78 also of cylindrical shape. The interior wall 76 internally defines a central space 80. Externally, the interior wall in combination with the exterior wall 78 defines an interior space 82 of annular cross section.

At each of its ends, the exterior wall 78 widens to form annular collars 84A and 84B respectively. Once the loop 74 has been folded, one of the annular collars, termed the annular bearing collar 84A of one symmetric branch 72 comes to bear against one of the annular collars 84, namely the annular bearing collar 84A, of the other branch 72. The annular collars 84 left free will be termed the annular connecting collars and denoted 84B. The interior wall 76 widens at each of its ends to form annular collars termed either bearing collars 86A or connecting collars 86B depending on whether or not they come into contact with a collar of the same combined form of end-piece 70. Once the loop 74 has been folded, the bearing collars 86A and 84A of the interior 76 and exterior 78 walls come to bear against the bearing collars 86A and 84A of the interior 76 and exterior 78 walls of the other symmetric branch 72.

On the same side as the bearing collars 84A and 86A, each symmetric branch 72 has a first indentation 88 of a shape tailored to house part of the cross section of the reservoir 11 and a second indentation 90 of a shape tailored to partially house the cross section of the flat tube 12, the first 88 and second 90 indentations communicating with one another. The second indentation 90 opens into the central space 80 while the first indentation 88 opens into the interior space 82 of the symmetric branch 72.

Figure 15:
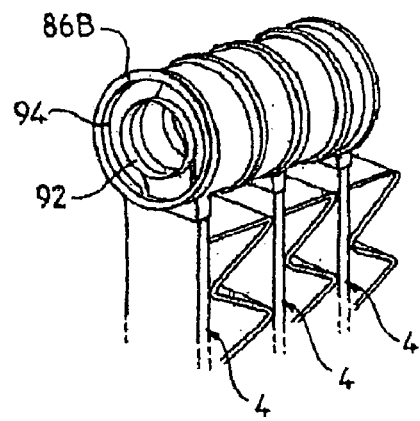
FIG. 15 is a perspective view of several end-pieces of FIG. 14 combined.

By successively stacking together combined end-pieces 70 of the type illustrated in FIG. 15 the following are formed:
a passage 92 for the circulation of refrigerant, acting as a manifold, this being formed by the combination of the central spaces 80, a passage 94 for supplying thermal storage material, this being formed by combining the interior spaces 82 which intercommunicate.

This configuration of the combined end-piece 70 offers the advantage of occupying a small amount of space while at the same time providing a simple way of filling each of the storage volumes of the reservoirs 11.

Figure 16:
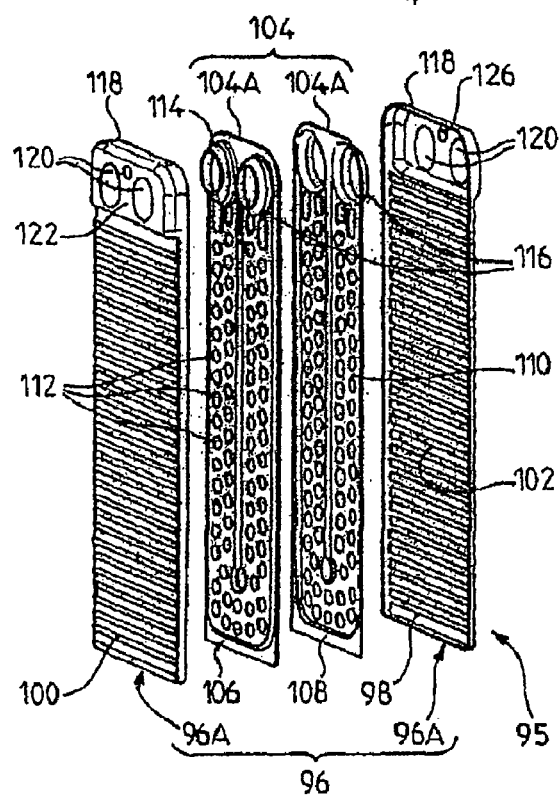
FIG. 16 is an exploded perspective view of a heat-exchange element in another embodiment of the invention.

FIG. 16 is an exploded perspective view of a heat-exchange element 95 in another embodiment of the invention. The heat-exchange element 95 consists of a reservoir 96 and a fluid-circulation tube 104.

The reservoir 96 in FIG. 16 consists of two pressed plates 96A, or end-plates, shaped from sheet metal and each, having a bearing face 98 and an exterior face 100. The bearing faces 98 are designed in such a way that the bearing face 98 of one pressed plate 96A can come to bear against the bearing face 98 of the other pressed plate 96A. Each bearing face 98 is also provided with an indentation 102 the shape of which is designed to accommodate more or less half the cross section, and most of the length, of a fluid-circulation tube.

In one particular embodiment illustrated by FIG. 16, the tube 104 for circulating the heat-transfer fluid is a tube in two parts consisting of two pressed plates 104A each having an exterior face 106 and a bearing face 108. The bearing face 108 of each of the pressed plates 104A is designed in such a way that it can come to bear against the bearing face 108 of the other pressed plate 104A. The bearing faces 108 have a U-shaped indentation 110 and thus form a tube in the overall shape of U, when the two pressed plates 104A are combined. On the exterior face 106 of the pressed plates 104A there are recesses 112 able, once the tube 104 has been housed between the two pressed plates 104A to hold the thermal storage material. Provided at the free ends of the branches of the U of each of the pressed plates 104A is a tube half-end-piece 114 shaped in the same piece of sheet metal from which the pressed plate 104A originated. The tube half-end-piece 114 has two annular collars 116 on its exterior face side 106.

In an embodiment variant of the heat-exchange element 95 of FIG. 16, which variant is not depicted, the bearing face 98 of each pressed plate 96A comes to bear against the exterior face 106 of a pressed plate 104A and, the bearing faces 108 of the pressed plates 104A come to bear against one another.

At one of the ends of each of the pressed plates 96A there is a shell 118 parallelepipedal overall shape, in the form of an indentation of the bearing face 102 of the pressed plate 96A. Two shells 118 when combined form the reservoir end-piece 96. Two circular holes 120 are made in each of the shells 118, which correspond to the openings defined by the annular collars 116 in the pressed plates 104A. Once the two pressed plates 104A have been combined and housed between the two pressed plates 96A joined together, a reservoir 96 is formed within which a fluid-circulation tube 104 is housed. Each of the shells 118 has a bearing face 122 lying on the same side as the exterior face 100 of the pressed plate 96A and which can come to bear against the bearing face 122 of an adjacent shell 118 in the heat exchanger.

Thus combined by successive stacking of the bearing faces 122, the shells 118 in combination with the annular collars 116 form two tubular fluid-circulation passages the axes of which are perpendicular to the axis of the U-shaped tubes. The refrigerant can circulate within these passages.

Figure 17:
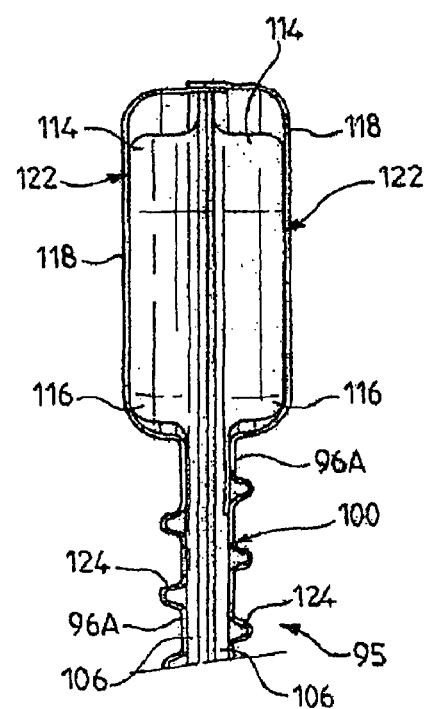
FIG. 17 is a part view, from the side, of the heat-exchange element of FIG. 16.

As shown by FIG. 17, the pressed plates 96A are provided, in the region of the indentation on their bearing face 98, with additional indentations 124 uniformly distributed over the height of each of the pressed plates 96A and running across the entire width of the pressed plate 96A. These indentations 124 allow the indentations 112 that hold the U-shaped fluid-circulation tube to be placed in communication. As an option, the bearing face 122 of the shells 118 may have a passage 126, a circular one in this exemplary embodiment, so that the inside of the reservoir 96 can be supplied with thermal storage material.

It will be noted that in the heat-exchange element 95, the tube 94 and the reservoir 96 are nested or imbricated so that, in a plane parallel to the pressed plates 96A, the fluid-circulation tube portion is flanked by two portions of thermal storage material reservoir.

Figure 18:
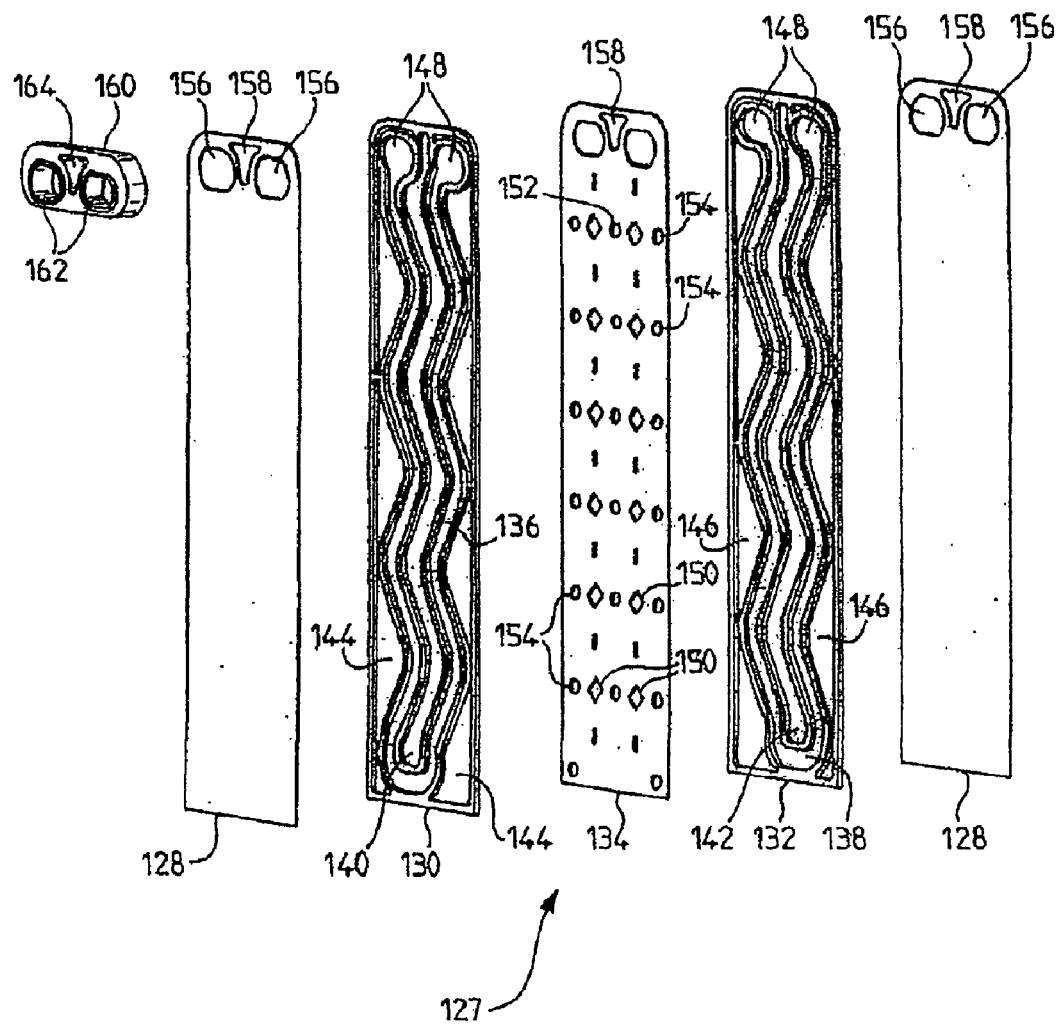
FIG. 18 is an exploded perspective view of a heat-exchange element in another embodiment of the invention.

FIG. 18 is an exploded perspective view of a heat-exchange element 127 in another embodiment of the invention. The heat-exchange element consists of two generally rectangular closing-off plates 128 between which a first intermediate plate 130 and a second intermediate plate 132 are interposed, both intermediate plates being of rectangular overall appearance and substantially identical to the closing-off plates 128. Interposed between the first 130 and second 132 intermediate plates is an intermediate closing-off plate 134 of rectangular overall appearance substantially identical to the appearance of the closing-off plate 128 and the intermediate plates 130 and 132.

Cut into the first 130 and second 132 intermediate plates are the profiles of a first 136 and a second 138 tube for the circulation of heat-transfer fluid. The first 136 and second 138 profiles are of similar shapes and have the overall appearance of a U. Each of the branches of the U has a series of corrugations such that the waves on one branch complement the waves on the facing branch of the U. Cut between the branches of the U of the first 136 and of the second 138 tube profile are the profile of a first central reservoir 140 and the profile of a second central reservoir 142, respectively. The appearance of the profiles of the first 140 and second 142 central reservoirs complement the appearance of each of the branches of the U. On the outside of the branches of the U of each of the intermediate plates 130 and 132 first 144 and second 146 lateral reservoirs are respectively formed. The shape of the first 144 and second 146 lateral reservoirs partially complements the shape of a branch of the U and for the remainder, complements an edge of the intermediate plate 130 or 132. At the free ends of the branches of the Us, the profiles of the first 136 and second 138 tubes widen each time to form a more or less ovalized end 148. The intermediate closing-off plate 134 has a series of first drillings 150 distributed in a U shape. This U shape follows the overall appearance of the first 136 and second 138 tubes.

Once the first 130 and second 132 intermediate plates have been placed one on each side of the intermediate closing-off plate 134, the first 136 and second 138 fluid-circulation tube profiles are placed in communication via the first holes 150. Thus, the uniform distribution of the first holes 150 ensures good fluidic communication between the first 136 and second 138 tubes. In one particular embodiment, the first holes 150 are diamond shaped.

Furthermore, the intermediate closing-off plate 134 has a series of second holes 152 positioned aligned midway along the height of the intermediate closing-off plate 134 and which allow the first 140 and second 142 central reservoirs to be placed in communication with each other. The intermediate closing-off plate 134 finally has a series of lateral third holes 154 aligned along the height of the intermediate closing-off plate 134 and placing the first 144 and second 146 lateral reservoirs in communication.

The closing-off plates 128 and the intermediate closing-off plate 134 each have, in their upper part, two ovalized orifices 156 corresponding to the ovalized profile of the free ends 148 of the Us of the fluid-circulation tubes.

Furthermore, the closing-off plates 128 and 134 have an additional orifice 158 of more or less triangular appearance and which is superposed both on part of the first 140 and second 142 central reservoirs and part of the first 144 and second 146 lateral reservoirs. Thus, this additional orifice 158 allows the reservoirs to be filled with storage material.

When the closing-off plates 128, the intermediate closing-off plate 134 and the first 130 and second 132 intermediate plates are assembled, the heat-exchange element 127 comprises a first 136 and a second 138 fluid-circulation tube with the overall appearance of a U and in communication with each other. The heat-exchange element 127 further comprises six reservoirs of thermal storage material, also in communication with one another.

In the heat-exchange element 127, the tubes 136 and 138 and the reservoirs are arranged nested or imbricated. In effect, in a plane parallel to the closing-off plates for example, there is a fluid-circulation passage between each pair of two reservoirs.

Figure 19:
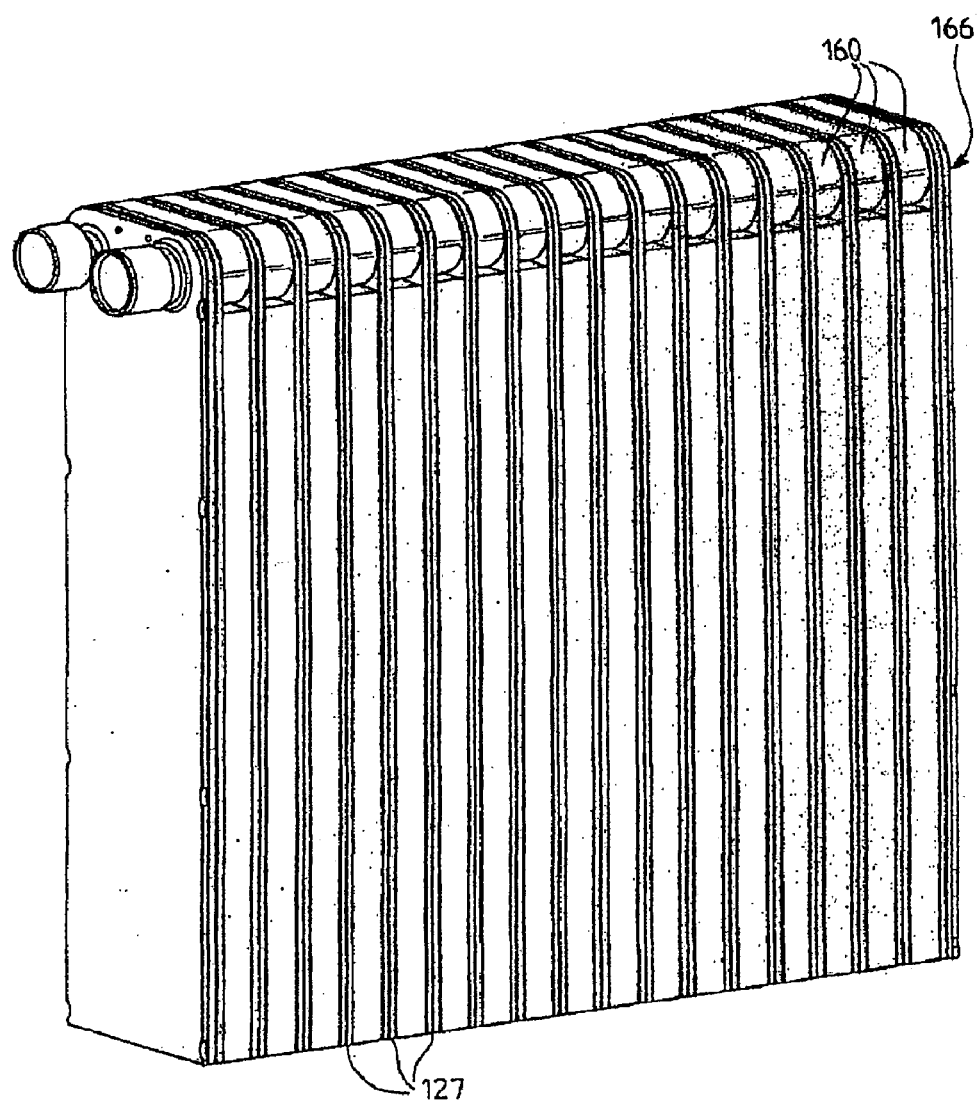
FIG. 19 is a perspective view of a heat exchanger made of heat-exchange elements of FIG. 18.

FIG. 19 is a perspective view of a heat exchanger made up of heat-exchange elements of FIG. 18. In this heat exchanger, there are a plurality of heat-exchange elements 127 aligned in a bundle and placed in communication with one another by spacer pieces 160. A spacer piece 160 is also illustrated in FIG. 18. The spacer piece 160 is in the form of a parallelepipedal component in which two distinct holes 162 are formed, these corresponding to the holes 156 made in the closing-off plates 128 and a third distinct hole 164 corresponding to the additional holes 158 made in the closing-off plates 128. Stacking these spacer pieces 160 together creates a manifold 166.

Other embodiments may be imagined on the basis of those described hereinabove.

Thus, FIG. 18 illustrates a heat-exchange element 127 in which the corrugations of the profiles of the first 136 and second 138 fluid-circulation tubes are in phase opposition (that is to say that, a corrugation of the profile of the first tube 136, which corrugation faces towards the closest edge of the first intermediate plate 130 is situated facing a corrugation of the profile of the second tube 138 which corrugation is orientated towards the furthest edge of the second intermediate plate 132). It may be conceivable to have the corrugations of the profiles of the first 136 and second 138 fluid-circulation tubes in phase alignment. In this case, the intermediate closing-off plate 134 may be omitted and the first 130 and second 132 intermediate plates combined, for example by brazing them together.

The first 130 and second 132 intermediate plates depicted in FIG. 18 are identical sand have been positioned in opposition. They may be identical and positioned symmetrically. The intermediate closing-off plate 134 may then be omitted as described in the paragraph above.

The profiles of the first 136 and second 138 tubes may also differ from one another. In this case, the portions of these profiles that become superposed are advantageously placed in communication via at least one hole made in each instance in the intermediate closing-off plate 134 facing these portions.

The holes made in the intermediate closing-off plate 134 have been described as being diamond shaped in respect of the first holes 150 and round in respect of the second 152 and third 154 holes. Different shapes may be employed for these holes.

In an unillustrated embodiment of the heat-exchange element 127, the first intermediate plate 130 and the second intermediate plate 132 may be produced by pressing. In this case, the profiles of the first 136 and second 138 tubes are shaped by pressing in a sheet metal plate. They then each have a bottom. As a result, the closing-off plates 128 may be omitted.

The purpose of the tubes is to create fluid-circulation passages. The tubes may thus be of the plate, bent, extruded, flat tube, type or embodied in any other known way.

The purpose of the reservoirs is to create passages for accommodating thermal storage material. These reservoirs may be of the plate reservoir, bent tube reservoir, extruded reservoir, capsule reservoir type or may be embodied in any other known way.

Various types of tube may be combined with reservoirs of various types.

The heat-transfer fluid may be a fluid able to store heat energy or cold energy, that is to say a refrigerant, for example $CO_2$.

The thermal storage material may be a material for storing cold or a material form storing heat. Furthermore, it may adopt the form of a solid material (for example one in the form of a salt), a liquid, a material that changes phase, or alternatively may be of the liquid refrigerant type.

The reservoirs may be used in a device termed a passive storage device, that is to say in one in which there is no circulation of thermal storage material within the reservoirs, or alternatively in a device said to be of the active storage type, that is to say a device in which storage material is circulated within the reservoirs, by means of a thermal storage material loop or circuit where circulation is pump-driven.

Finally, particularly FIG. 1, describes a heat exchanger equipped with two header boxes 2. It is possible to imagine a heat exchanger equipped with just one header box associated with so-called U-shaped fluid-circulation tubes.

In the embodiments illustrated in FIGS. 16 and 17 on the one hand, and FIGS. 18 and 19 on the other hand, the heat-transfer fluid is circulated in a U-shaped path. However, it is possible to circulate in an I-shaped path, for example by disconnecting the two branches of the U to form two fluid-circulation tubes or alternatively by combining them into a single I-shaped tube.

The invention is not restricted to the embodiments described hereinabove solely by way of example, but encompasses all variants that a person skilled in the art may image within the scope of the claims which follow.

The invention claimed is:

1. A heat exchanger comprising a plurality of tubes for the circulation of a heat-transfer fluid, the ends of said tubes opening into manifolds-and reservoirs of thermal storage material in contact with the tubes so that the storage material and the heat-transfer fluid exchange heat with one another, characterized in that it comprises a plurality of heat-exchange elements each one housing at least one reservoir and at least one tube which are nested together, said heat-exchange element comprising two closing-off plates and at least one interposed intermediate plate in which at least one tube profile and at least one reservoir profile are cut.

2. The heat exchanger as claimed in claim 1, characterized in that each said heat-exchange element comprises a reservoir within which a said tube is located.

3. The heat exchanger as claimed in claim 2, characterized in that the reservoir forms two volumes for storing thermal storage material, one on each side of said tube.

4. The heat exchanger as claimed in claim 1, characterized in that the tube profile has the overall appearance of a U.

5. The heat exchanger as claimed in claim 4, characterized in that the branches of the U extend in the form of corrugations and in that the corrugations of the branches complement one another.

6. The heat exchanger as claimed in claim 5, characterized in that a reservoir profile is cut from between each pair of branches of the U and from outside each branch of the U.

7. The heat exchanger as claimed in claim 4, characterized in that a reservoir profile is cut from between each pair of branches of the U and from outside each branch of the U.

8. The heat exchanger as claimed in claim 1, characterized in that the profile of each reservoir complements at least part of the profile of a tube.

9. The heat exchanger as claimed in claim 1, characterized in that said heat-exchange element further comprises a second interposed intermediate plate in which at least one tube profile and one reservoir profile are cut.

10. The heat exchanger as claimed in claim 9, characterized in that an intermediate closing-off plate is inserted between the first and second intermediate plates.

11. The heat exchanger as claimed in claim 10, characterized in that the intermediate closing-off plate includes at least one series of holes placing at least one tube profile and/or at least one reservoir profile of each of the first and second intermediate plates in communication.

12. The heat exchanger as claimed in claim 1, characterized in that the closing-off plates have at least one hole in communication with a tube profile, and in that the closing-off plates also have an additional hole in communication with a reservoir.

13. The heat exchanger as claimed in claim 1, characterized in that the heat-transfer fluid is a fluid of the refrigerant type and in that the thermal storage material is a material capable of storing cold energy.

* * * * *